(12) United States Patent
Meng et al.

(10) Patent No.: US 11,521,172 B2
(45) Date of Patent: Dec. 6, 2022

(54) METHOD AND APPARATUS FOR SCHEDULING ITEM, AND COMPUTER-READABLE STORAGE MEDIUM

(71) Applicant: Beijing Xiaomi Pinecone Electronics Co., Ltd., Beijing (CN)

(72) Inventors: Qingchun Meng, Beijing (CN); Linhao Gao, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 17/021,685

(22) Filed: Sep. 15, 2020

(65) Prior Publication Data

US 2021/0342782 A1 Nov. 4, 2021

(30) Foreign Application Priority Data

Apr. 29, 2020 (CN) .......................... 202010359152.6

(51) Int. Cl.
G06Q 10/08 (2012.01)
G06Q 10/06 (2012.01)
G06Q 30/02 (2012.01)

(52) U.S. Cl.
CPC ... G06Q 10/0875 (2013.01); G06Q 10/06375 (2013.01); G06Q 30/0202 (2013.01)

(58) Field of Classification Search
CPC .......... G06Q 10/0875; G06Q 30/0202; G06Q 10/0675; G06Q 10/083; G06Q 10/087
USPC .................................................. 705/29, 330
See application file for complete search history.

(56) References Cited

U.S. PATENT DOCUMENTS

2014/0330741 A1* 11/2014 Bialynicka-Birula ......................
G06Q 10/0838
705/341

FOREIGN PATENT DOCUMENTS

CN 110046755 A * 7/2019 ............. G06Q 10/04
CN 110046755 A 7/2019

OTHER PUBLICATIONS

Extended European Search Report dated Nov. 3, 2020 in European Patent Application No. 20198760.9, 7 pages.

* cited by examiner

Primary Examiner — Ariel J Yu
Assistant Examiner — Denisse Y Ortiz Roman
(74) Attorney, Agent, or Firm — Oblon, McClelland, Maier & Neustadt, L.L.P.

(57) ABSTRACT

A method and apparatus for scheduling an item, and a computer-readable storage medium are provided. The method can include acquiring a first time sequence corresponding to a target item in a target warehouse, the first time sequence including shipment volume information of the target item corresponding to each unit time within a first historical period. The method can further include determining, according to the first time sequence and a target period to be predicted, total shipment volume information of the target item within a target period through a shipment prediction model, the shipment prediction model including a plurality of parallel first time sequence sub-models and a weighted sub-model which is connected to an output of each of the first time sequence sub-models, and scheduling the target item in the target warehouse according to the total shipment volume information and current inventory information of the target item in the target warehouse.

11 Claims, 5 Drawing Sheets

METHOD AND APPARATUS FOR SCHEDULING ITEM, AND COMPUTER-READABLE STORAGE MEDIUM

CROSS-REFERENCE TO RELATED APPLICATIONS

The present application is based upon and claims priority to Chinese Patent Application No. 202010359152.6, filed on Apr. 29, 2020, the entire contents of which are incorporated herein by reference.

BACKGROUND

After the production of various types of items is completed, the items usually need to be distributed to a respective warehouse so as to support the needs of users within a coverage area of the warehouse. With the development of logistics networks, users have gradually increased their requirements for the timeliness of item shipping. In related art, usually manual allocation can be used to schedule items to respective warehouses. If there are few items in the warehouse, items can be scheduled from other warehouses to complete the shipping when the items are shipped. If there are more items in the warehouse, it can negatively affect the supply and demand of other warehouses.

SUMMARY

The present disclosure relates to the technical field of computers, including to a method and apparatus for scheduling an item, and a computer-readable storage medium.

According to a first aspect of the present disclosure, there is provided a method for scheduling an item. The method can include that a first time sequence corresponding to a target item in a target warehouse is acquired, the first time sequence including shipment volume information of the target item corresponding to each unit time within a first historical period. Further, total shipment volume information of the target item within a target period can be determined through a shipment prediction model according to the first time sequence and a target period to be predicted, the target period including at least one unit time, the shipment prediction model including a plurality of parallel first time sequence sub-models and a weighted sub-model which is connected to an output of each of the first time sequence sub-models, each of the first time sequence sub-models being configured to determine shipment estimation information of the target item within the target period according to the first time sequence and the target period, and the weighted sub-model being configured to perform a weighted summation on pieces of the shipment estimation information which are output by the first time sequence sub-models, so as to determine the total shipment volume information according to a result of weighted summation. Additionally, the method can include that the target item in the target warehouse is scheduled according to the total shipment volume information and current inventory information of the target item in the target warehouse.

According to a second aspect of the present disclosure, there is provided an apparatus for scheduling an item. The apparatus can include an acquisition module that is configured to acquire a first time sequence corresponding to a target item in a target warehouse, the first time sequence including shipment volume information of the target item corresponding to each unit time within a first historical period. Further, the apparatus can include a determination module that is configured to determine, according to the first time sequence and a target period to be predicted, total shipment volume information of the target item within a target period through a shipment prediction model, the target period including at least one unit time, the shipment prediction model including a plurality of parallel first time sequence sub-models and a weighted sub-model which is connected to an output of each of the first time sequence sub-models, each of the first time sequence sub-models being configured to determine shipment estimation information of the target item within the target period according to the first time sequence and the target period, and the weighted sub-model being configured to perform a weighted summation on pieces of the shipment estimation information which are output by the first time sequence sub-models, so as to determine the total shipment volume information according to a result of the weighted summation. Additionally, the apparatus can include a scheduling module that is configured to schedule the target item in the target warehouse according to the total shipment volume information and current inventory information of the target item in the target warehouse.

According to a third aspect of the present disclosure, there is provided an apparatus for scheduling an item. The apparatus includes a processor and a memory configured to store non-transitory processor-executable instructions. The processor can be configured to acquire a first time sequence corresponding to a target item in a target warehouse, the first time sequence including shipment volume information of the target item corresponding to each unit time within a first historical period. Further, the processor can be configure to determine total shipment volume information of the target item within a target period through a shipment prediction model according to the first time sequence and a target period to be predicted, the target period including at least one unit time, the shipment prediction model including a plurality of parallel first time sequence sub-models and a weighted sub-model which is connected to an output of each of the first time sequence sub-models, each of the first time sequence sub-models being configured to determine shipment estimation information of the target item within the target period according to the first time sequence and the target period, and the weighted sub-model being configured to perform a weighted summation on pieces of the shipment estimation information which are output by the first time sequence sub-models, so as to determine the total shipment volume information according to a result of the weighted summation. Additionally, the processor can be configured to schedule the target item in the target warehouse according to the total shipment volume information and current inventory information of the target item in the target warehouse.

According to a fourth aspect of the present disclosure, there is provided a non-transitory computer-readable storage medium. The computer-readable storage medium stores computer program instructions that, when executed by a processor, implement the steps of the method for scheduling an item provided by the first aspect of the present disclosure.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
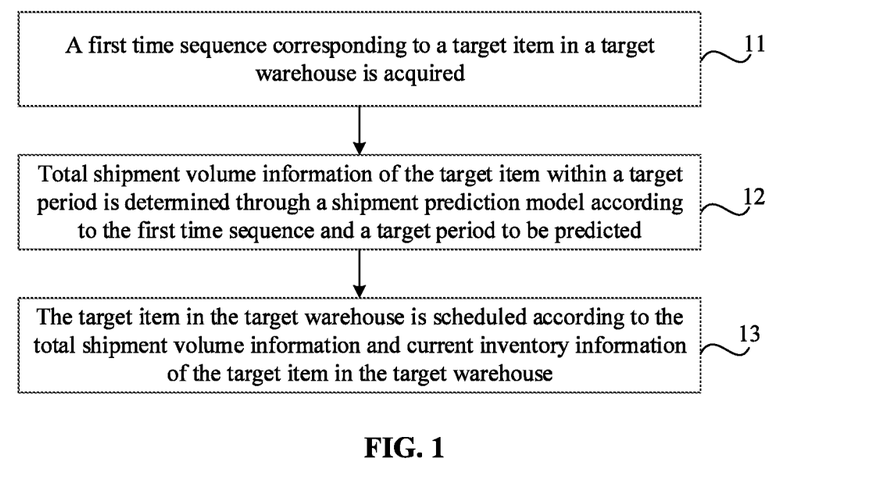
FIG. 1 is a flowchart of a method for scheduling an item according to an exemplary embodiment.

FIG. 1 is a flowchart of a method for scheduling an item according to an exemplary embodiment. As illustrated in FIG. 1, the method includes the following steps. In the step of block 11, a first time sequence corresponding to a target item in a target warehouse is acquired, the first time sequence including shipment volume information of the target item corresponding to each unit time within a first historical period. The first historical period may be set according to actual usage scenarios. For example, the first historical period may be set to the past 3 months, or may be set to the past 30 days, which is not limited in the present disclosure. Exemplarily, the unit time may be one day, and the first historical period is the past 30 days. The shipment volume information of an item P in a warehouse A for each day in the past 30 days may be acquired. The shipment volume information may be obtained according to actual shipment data, so that the shipment volume information for respective days in the 30 days are sorted in chronological order to form the first time sequence. The obtained sequence may be expressed as $(S_0, S_1, \ldots, S_{29})$.

In the step of block 12, total shipment volume information of the target item within a target period is determined through a shipment prediction model according to the first time sequence and a target period to be predicted, the target period including at least one unit time, the shipment prediction model including a plurality of parallel first time sequence sub-models and a weighted sub-model which is connected to an output of each of the first time sequence sub-models, each of the first time sequence sub-models being configured to determine shipment estimation information of the target item within the target period according to the first time sequence and the target period, and the weighted sub-model being configured to perform a weighted summation on pieces of the shipment estimation information which are output by the first time sequence sub-models, so as to determine the total shipment volume information according to a result of the weighted summation.

The target period to be predicted may be set according to actual usage requirements. For example, the target period to be predicted may include one unit time. Following the above example, in the present embodiment, the target period is one day. That is, shipment volume information of a next day may be predicted based on the first time sequence which is formed by the shipment volume information of the past 30 days.

Exemplarily, the shipment prediction model may include a plurality of parallel first time sequence sub-models. For example, the shipment prediction model may include sub-models M1, M2, M3, and M4. The plurality of first time sequence sub-models may be calculated independently according to the first time sequence and the target period. That is, the sub-models M1, M2, M3, and M4 are respectively calculated according to the first time sequence and the target period to obtain an output (i.e., N1, N2, N3, and N4, respectively) of each of the sub-models. In the present embodiment, N1, N2, N3, and N4 are shipment estimation information of the target item for a next day, which are determined by the sub-models M1, M2, M3, and M4, respectively. At this time, N1, N2, N3, and N4 are the shipment volume information for the next day. After that, the weighting sub-model may perform weighted summation on N1, N2, N3, and N4. In the present embodiment, a result of weighted summation may be directly determined as the total shipment volume information.

As another example, the target period to be predicted may include a plurality of unit times. Exemplarily, the unit time is one day, the target period may be 3 days. That is, total shipment volume information of next 3 days may be predicted based on the first time sequence which is formed by the shipment volume information for the past 30 days. In the present embodiment, the sub-models M1, M2, M3, and M4 are respectively calculated according to the first time sequence and the target period. The obtained shipment estimation information N1, N2, N3, and N4 are respectively used to represent the daily average shipment volume information, which is outputted by each sub-model, of the target item corresponding to the next 3 days. After that, the weighting sub-model may perform a weighted summation on N1, N2, N3, and N4. The result of weighted summation is the daily average shipment volume information of the target item in the target warehouse for the next 3 days which is obtained by integrating the plurality of sub-models. Therefore, in the present embodiment, when the total shipment volume information is determined according to the result of weighted summation, the product of the result of weighted summation and the number of unit time contained in the target period may be determined as the total shipment volume information.

In the step of block 13, the target item in the target warehouse is scheduled according to the total shipment volume information and current inventory information of the target item in the target warehouse, so that the shipment requirements of the target item in the target warehouse can be ensured.

In the above technical solution, by acquiring a first time sequence corresponding to a target item in a target warehouse, total shipment volume information of the target item within a target period may be determined through a shipment prediction model according to the first time sequence and a target period to be predicted. Then the target item in the target warehouse may be scheduled according to the total shipment volume information and current inventory information of the target item in the target warehouse. Through the above technical solution, when the total shipment volume information of the target item within the target period is determined through the shipment prediction model, each of the time sequence sub-models in the shipment prediction model can be predicted independently and in parallel, which can ensure the computational independence of each time sequence sub-model. Then a weighting sub-model is used to perform weighted summation on the outputs of respective time sequence sub-models, so as to comprehensively determine the total shipment volume information according to the outputs of the time sequence sub-models, which effectively ensures the accuracy of the determined total shipment volume information, thereby ensuring the accuracy of target item scheduling, effectively reducing manual workload, avoiding the problem in related arts that too many or too few items in the warehouse affect the timeliness of delivery and uneven resource allocation, and further improving the user experience.

Optionally, the shipment prediction model is obtained by the following operations of training samples are constructed according to shipment volume information of the target item in the target warehouse corresponding to each unit time within a second historical period. The second historical period may be selected according to actual usage scenarios, which is not limited in the present disclosure. Exemplarily, the first historical period may be the past 30 days, the second historical period may be the past 6 months, and the target period is one day. Then a 30-day time window may be determined, a time sequence which is formed by the shipment volume information for respective days included in the time window is taken as a training sequence in a training sample, and shipment volume information for a next day of the time window is taken as a target value corresponding to the training sequence to obtain a plurality of training samples.

After that, a preset model is trained according to the training samples. The preset model includes a plurality of parallel second time sequence sub-models and a weighted sub-model which is connected to an output of each of the second time sequence sub-models, and the number of the second time sequence sub-models is not less than the number of the first time sequence sub-models. As an example, the plurality of time sequence sub-models and the weighting sub-model may be directly combined to obtain the preset model. As another example, an embedded neural network model may be supported in a gluonts model, then the plurality of time sequence sub-models may be embedded in the gluonts model. Further, a fully connected layer fully connected in the plurality of time sequence sub-models may be added as the weighting sub-model to obtain the preset model.

The plurality of second time sequence sub-models in the preset model may be the same or different. Each of the second time sequence sub-models may be independently calculated, and a predicted output result may be obtained. For example, a training sample may be acquired, and a training sequence in the training sample may be input into each of the second time sequence sub-models. Then each of the second time sequence sub-models may output a respective predicted value corresponding to the training sample. That is, the shipment volume information for a next day is predicted based on the time sequences corresponding to the shipment volume information for the past 30 days, and the predicted values output by the second time sequence sub-models are weighted through the weighting sub-model, so as to obtain an output value of the preset model based on a weighting result.

After that, a loss of the preset model is determined by the output value and the target value corresponding to the training sequence. When the loss is greater than a training threshold, parameters in the preset model are adjusted according to the loss. That is, parameters of each second time sequence sub-model in the preset model and parameters of the weighting sub-model are adjusted, and when the loss is less than the training threshold, the training is finished. The loss of the preset model may be calculated by an existing loss function, which will not be repeated here. In order to improve the training efficiency and the convergence speed of the preset model, the learning rate of the model may be 1e-5, and an adam gradient optimization method is used to adjust the parameters of the preset model.

After the training of the preset model is finished, a weight of a connection between each of the second time sequence sub-models and the weighted sub-model in the preset model is acquired. The weight is a weight used for weighting, by the weighting sub-model, the predicted values which are output by respective second time sequence sub-models. A second time sequence sub-model with an absolute value of the weight greater than a preset threshold is determined as the first time sequence sub-model to obtain the shipment prediction model.

When the absolute value of the weight of the connection between the second time sequence sub-model and the weighting sub-model is less than or equal to a preset threshold, it indicates that the output result of the second time sub-model has little influence on a final output result of the preset model. At this time, the output result of the second time sequence sub-model can be ignored.

When the absolute value of the weight of the connection between the second time sequence sub-model and the weighting sub-model is greater than the preset threshold, it indicates that the output result of the second time sub-model has great influence on a final output result of the preset model. Therefore, in the present embodiment, only the second time sequence sub-model in the preset model, of which the absolute value of the weight is greater than the preset threshold, may be retained to obtain the shipment prediction model.

In the above technical solution, after the training of the preset model based on the training samples is finished, the second time sequence sub-model may be selected based on the weight of the connection between each second time sequence sub-model and the weighting sub-model in the preset model, and a plurality of time sequence sub-models with greater influence in the preset model are retained to obtain the shipment prediction model. The accuracy of the shipment prediction model can be effectively ensured, the structure of the shipment prediction model can be simplified, the amount of calculation required for determining the total shipment volume information of the target item within the target period based on the shipment prediction model can be reduced, and the efficiency of item scheduling can be improved.

Optionally, each of the first time sequence sub-models may be a model determined based on a time sequence decomposition method, for example, a time sequence sub-model determined based on a prophet algorithm. A time sequence is usually superposition or coupling of multiple types of variations. When predicting based on a time sequence, prediction may be made based on a plurality of decomposition items. For example, the output of the time sequence model may be divided into multiple types of influencing factors, such as trend change factors, periodic change factors, holiday change factors, error factors, and so on.

$$y(t)=g(t)+s(t)+h(t)+\varepsilon(t),$$

where y(t) represents a time sequence, and g(t) is a trend change factor item, and represents a trend change of shipment volume information over time; s(t) is a periodic change factor item, and represents a periodic continuous change of shipment volume information; h(t) is a holiday change factor item, and represents the influence of holidays on the shipment volume information; e (t) is an error factor item, and represents the influence of accidental factors on the shipment volume information. Optionally, time sequences corresponding to respective first time sequence sub-models have the same type of decomposition items, and parameters of the same decomposition item corresponding to respective first time sequence sub-models are different.

Exemplarily, in the present embodiment, each of the first time sequence sub-models includes each of the above decomposition items. That is, each of the first time sequence sub-models is composed of trend change factors, periodic change factors, holiday change factors and error factors. That is, respective first time sequence sub-models are the same type of time sequence model. In the present embodiment, the parameters corresponding to the same decomposition item in respective first time sequence sub-models are different, which may be set according to the statistics of historical shipment volume information. Taking the period change factor item as an example, based on the statistics of historical shipment volume information, it is found that the shipment volume information has undergone periodic changes in 2 weeks, 1 month, 2 months, 3 months, etc. Then the periodic change factor in the sub-model M1 may be set to 14 days, the periodic change factor in the sub-model M2 may be set to 30 days, the periodic change factor in the sub-model M3 may be set to 60 days, and the periodic change factor in the sub-model M4 may be set to 90 days. The parameter setting modes of other decomposition items are similar, and will not be repeated here.

Through the above technical solution, to the predict can be performed simultaneously and independently based on a plurality of time sequence sub-models of the same type, and the parameters of the same decomposition item corresponding to respective time sequence sub-models are different. That is, for the same decomposition item, prediction may be performed from the perspective of different parameters, so that the accuracy and comprehensiveness of time sequence prediction can be improved, the accuracy of the total shipment volume information output by the shipment prediction model can be improved, thereby ensuring the accuracy of items scheduling based on the shipment volume information, and improving the user experience.

Figure 2:
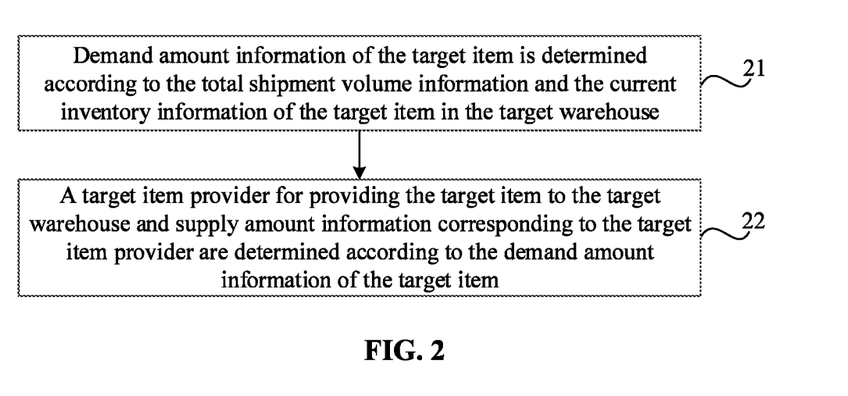
FIG. 2 is a flowchart of an exemplary implementation manner of scheduling a target item in a target warehouse according to total shipment volume information and current inventory information of the target item in the target warehouse according to an exemplary embodiment.

Optionally, in the step of block 13, an exemplary implementation manner of scheduling the target item in the target warehouse according to the total shipment volume information and the current inventory information of the target item in the target warehouse is as follows. As illustrated in FIG. 2, the step may include the following operations.

In the step of block 21, demand amount information of the target item is determined according to the total shipment volume information and the current inventory information of the target item in the target warehouse.

As an example, quantity information of the target item in the target warehouse may be directly determined as the current inventory information, so that the quantity difference between the total shipment volume information and the current inventory information of the target item in the target warehouse may be determined as the demand amount information. The demand amount information is used to indicate the quantity information of the target item that needs to be scheduled from the item provider of the target item.

As another example, the target warehouse currently has pre-sale information corresponding to the target item, and the pre-sale information corresponding to the target item indicates that the items have been booked but have not been out of the warehouse. Although the items currently exist in the target warehouse, they cannot be provided to other users. Therefore, in this case, the quantity information of the target item in the target warehouse may be acquired, and the difference between the quantity information and the pre-sale information may be determined as the current inventory information. For example, the acquired quantity information of the target item in the target warehouse is 10000 and the pre-sale information is 1000, then the current inventory information of the target item in the target warehouse is 9000, so that the quantity difference between the total shipment volume information and the current inventory information may be determined as the demand amount information.

In the step of block 22, a target item provider for providing the target item to the target warehouse and supply amount information corresponding to the target item provider is determined according to the demand amount information of the target item.

As a result, the actual demand amount information of the target item in the target warehouse may be determined, and the target item provider and supply amount information corresponding to the target item provider may be determined based on the demand amount information to ensure the accuracy of the demand amount information of the target item, thereby improving the accuracy of scheduling the target item, avoiding waste of costs or delays in scheduling time which are caused by uneven scheduling, and meeting the needs of users.

Optionally, in the step of block 22, an exemplary implementation manner of determining the target item provider for providing the target item to the target warehouse and the supply amount information corresponding to the target item provider according to the demand amount information of the target item is as follows. The step may include the following operations.

Cost characteristic information of each of the item providers, which are capable of providing the target item to the target warehouse, about providing the target item is determined. Each warehouse is pre-provided with corresponding respective item provider. There may be one item provider or more. Exemplarily, the cost characteristic information may be transportation cost information and/or time cost information. The transportation cost information may be used to indicate the unit cost of transporting target item. Taking a mobile phone as an example, when the mobile phones are transported, a plurality of mobile phones can be packaged and transported in units of packages. For example, every 100 mobile phones can be packaged, then the determined transportation cost information is the cost corresponding to each package (i.e., 100) of mobile phones. The time cost information is used to indicate the time required to transport the target item from the item provider to the target warehouse. The cost characteristic information may be obtained based on the historical transportation data of providing the target item by the item provider to the target warehouse.

The target item provider and supply amount information corresponding to the target item provider is determined according to the cost characteristic information of each of the item providers and the demand amount information of the target item.

In the present embodiment, when determining a target item provider, it may be selected from the item providers corresponding to the target warehouse, and the scheduling of the target item from the item provider to the target warehouse based on the cost characteristic information of each item provider can be realized, thereby effectively meeting requirements for the demand amount information of the target item in the target warehouse, and saving the cost.

Optionally, there are multiple types of cost characteristic information, and each type of cost characteristic information has corresponding respective weight. Exemplarily, as described above, the weight of the transportation cost information C is 0.4, and the weight of the time cost information T is 0.6.

An exemplary implementation manner of determining the target item provider and the supply amount information corresponding to the target item provider according to the cost characteristic information of each of the item providers and the demand amount information of the target item is as follows. The step may include the following operations.

For each of the item providers, the multiple types of cost characteristic information of the item provider are weighted according to the weights corresponding to respective types of cost characteristic information, to obtain target item information of the item provider about providing the target item.

Exemplarily, the target warehouse corresponds to four item providers, i.e., item providers H1, H2, H3, and H4. The cost characteristic information corresponding to the item provider H1 is $C_1$ and $T_1$, the cost characteristic information corresponding to the item provider H2 is $C_2$ and $T_2$, the cost characteristic information corresponding to the item provider H3 is $C_3$ and $T_3$, and the cost characteristic information corresponding to the item provider H4 is $C_4$ and $T_4$, respectively. Therefore, the target cost information of each item provider may be determined by the weights described above through $W(H_i)=0.4*C_i+0.6*T_i$, where $W(H_i)$ represents target cost information of the $i^{th}$ item provider, and i is used to represent a serial number of the item provider.

The target item provider is sequentially selected from the item providers in an ascending order of the target cost information, and the supply amount information corresponding to the target item provider is determined, so that the sum of the supply amount information corresponding to all the target item providers reaches the demand amount information of the target item.

Exemplarily, the ascending order of the determined target cost information corresponding to respective item providers is $W(H_4)<W(H_2)<W(H_1)<W(H_3)$. When determining the target item provider, the item provider may be selected as the target provider in this order. If the demand amount information is greater than the available quantity information of the item provider, the available quantity information of the item provider is taken as the supply amount information corresponding to the target item provider. And the result of subtracting the available quantity information of the item provider from the demand amount information is determined as new demand amount information. Then a next target item provider continues to be selected according to the new demand amount information. If the demand amount information is not greater than the available quantity information of the item provider at this time, the demand amount information is taken as the supply mount information corresponding to the target item provider, and the selection is stopped.

As an example, the demand amount information is 5000. According to the above order, the item provider H4 is firstly determined as the target item provider. If the available quantity information of the item provider H4 is 2000, the available quantity information 2000 of the item provider H4 is determined as the supply amount information of the item provider H4. After that, the new demand amount information is determined to be 3000 (5000−2000), the item provider H2 is selected as the next target item provider, and the supply amount information of the item provider H2 is determined to be 2500 through the above manner. Then the new demand amount information is determined to be 500 (3000−2500), and the item provider H1 is selected as the next target item provider. At this time, the available quantity information of the item provider H1 is 1000. That is, the demand amount information is less than the available quantity information of the item provider H1. At this time, the demand amount information 500 may be determined as the supply amount information of the item supplier H1, and the selection is stopped. Therefore, the target article providers determined by the above manner are the item providers H4, H2, and H1, and the corresponding supply amount information is 2000, 2500, and 500 respectively.

In the above technical solution, the combination of the target items scheduled from the target warehouse may be determined according to the cost characteristic information of each of the item providers, which can not only meet the demand amount of the target warehouse, but also effectively reduce the cost of target item scheduling and improve the scheduling efficiency of the target items.

Optionally, the method further includes that the weight corresponding to each type of cost characteristic information is periodically updated.

As mentioned above, when the item provider provides the target cost information of the target item, it is obtained by weighting multiple types of cost characteristic information of the item provider according to the weights corresponding to respective types of cost characteristic information. Therefore, the accuracy of the weights of respective types of cost characteristic information will affect the accuracy of the target item scheduling. Therefore, in the present embodiment, the weights corresponding to respective types of cost characteristic information may be updated at an interval of a preset time. For example, the weight corresponding to each type of cost characteristic information may be re-determined every 3 months, and the update is performed.

As an example, it is possible to manually set the weights corresponding to respective types of cost characteristic information through the statistics of historical shipment data, so as to update the weights corresponding to respective types of cost characteristic information.

As another example, multiple types of combinations of weights corresponding to cost characteristic information may be set in advance. Taking transportation cost information and time cost information as an example, the weight combinations are set as follows:

{(0.4, 0.6), (0.5, 0.5), (0.65, 0.35)}, i.e., three combinations corresponding to the weights of transportation cost information and time cost information. After that, each group of weights may be used as test weights to determine a test supply amount set corresponding to the preset demand amount information. The test supply amount set includes a target item provider and supply amount information corresponding to the target item provider. The specific implementation manner of determining a test supply amount set under the preset demand amount information has been described in detail above, and will not be repeated here. After determining the test supply amount set corresponding to each weight combination, the matching degree between each test supply amount set and the supply-and-demand requirements is calculated. For example, the matching degree may be characterized by the user satisfaction rate of the demand for the target item. Exemplarily, when scheduling the target item according to the test supply amount set corresponding to the weight combination (0.4, 0.6), the user satisfaction rate of the demand for the target item is 88%. That is, after the user issues an order for the target item, 88% of the order may be timely shipped. As the satisfaction rate is higher, the matching degree is higher. The weight combination corresponding to the maximum satisfaction rate may be determined as the target weight combination, so that the weight corresponding to each type of cost characteristic information may be updated based on the target weight combination.

Thus, through the above technical solution, the weight corresponding to each type of the cost characteristic information is periodically updated, which can ensure real-time of the weights corresponding to respective types of cost characteristic information. And the supply amount information is matched with the current shipment volume information, which can further improve the accuracy of target item scheduling, and meet the needs of users.

Figure 3:
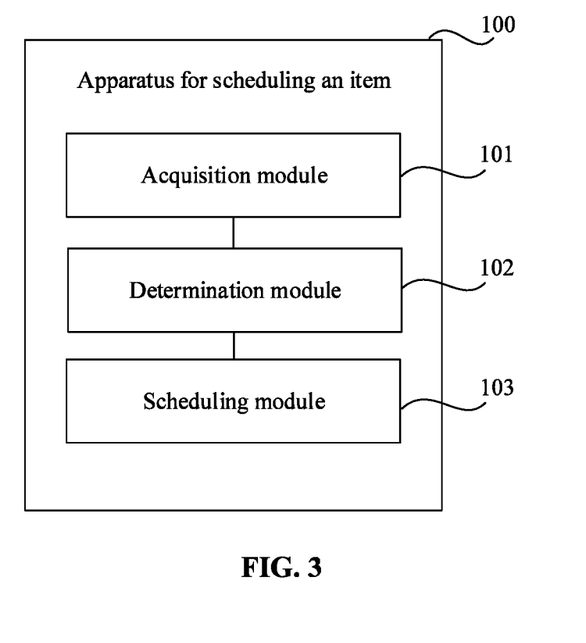
FIG. 3 is a block diagram of an apparatus for scheduling an item according to an exemplary embodiment.

FIG. 3 is a block diagram of an apparatus for scheduling an item according to an exemplary embodiment. Referring to FIG. 3, the apparatus 100 includes an acquisition module 101, a determination module 102 and a scheduling module 103. Of course, it should be understood that the one or more modules described in this specification can be implemented by processing circuitry.

The acquisition module 101 is configured to acquire a first time sequence corresponding to a target item in a target warehouse, the first time sequence including shipment volume information of the target item corresponding to each unit time within a first historical period.

The determination module 102 is configured to determine, according to the first time sequence and a target period to be predicted, total shipment volume information of the target item within a target period through a shipment prediction model, the target period including at least one unit time, the shipment prediction model including a plurality of parallel first time sequence sub-models and a weighted sub-model which is connected to an output of each of the first time sequence sub-models, each of the first time sequence sub-models being configured to determine shipment estimation information of the target item within the target period according to the first time sequence and the target period, and the weighted sub-model being configured to perform a weighted summation on pieces of the shipment estimation information which are output by the first time sequence sub-models, so as to determine the total shipment volume information according to a result of the weighted summation.

The scheduling module 103 is configured to schedule the target item in the target warehouse according to the total shipment volume information and current inventory information of the target item in the target warehouse.

The shipment prediction model can be obtained by training samples are constructed according to shipment volume information the target item in the target warehouse corresponding to each unit time within a second historical period, and a preset model is trained according to the training samples, wherein the preset model includes a plurality of parallel second time sequence sub-models and a weighted sub-model which is connected to an output of each of the second time sequence sub-models, and the number of the second time sequence sub-models is not less than the number of the first time sequence sub-models. Further, after the training of the preset model is finished, a weight of a connection between each of the second time sequence sub-models and the weighted sub-model in the preset model is acquired, and a second time sequence sub-model with an absolute value of the weight greater than a preset threshold can be determined as the first time sequence sub-model to obtain the shipment prediction model.

Optionally, time sequences corresponding to respective first time sequence sub-models have the same type of decomposition items, and parameters of the same decomposition item corresponding to respective first time sequence sub-models are different.

The scheduling module 103 can include a first determination sub-module that is configured to determine demand amount information of the target item according to the total shipment volume information and the current inventory information of the target item in the target warehouse, and a second determination sub-module that is configured to determine a target item provider for providing the target item to the target warehouse and supply amount information corresponding to the target item provider according to the demand amount information of the target item.

Optionally, the second determination sub-module can include a third determination sub-module that is configured to determine cost characteristic information of each of item providers, which are capable of providing the target item to the target warehouse, about providing the target item, and a fourth determination sub-module that is configured to determine the target item provider and the supply amount information corresponding to the target item provider according to the cost characteristic information of each of the item providers and the demand amount information of the target item.

Optionally, the cost characteristic information is of multiple types, and each type of cost characteristic information has corresponding respective weight.

The fourth determination sub-module can include a weighting sub-module that is configured to weight, for each of the item providers, the multiple types of cost characteristic information of the item provider according to the weights corresponding to respective types of cost characteristic information to obtain target item information of the item provider about providing the target item, and a fifth determination sub-module that is configured to sequentially select, in an ascending order of the target cost information, the target item provider from the item providers, and determine the supply amount information corresponding to the target item provider, so that the sum of the supply amount information corresponding to all the target item providers reaches the demand amount information of the target item.

Optionally, the apparatus 100 can further include an update module that is configured to update the weight corresponding to each type of cost characteristic information periodically.

With regard to the apparatus in the above embodiments, the specific manner in which the respective modules perform the operations has been described in detail in the embodiments relating to the method, and will not be explained in detail herein.

The present disclosure also provides a non-transitory computer-readable storage medium. The computer-readable storage medium stores computer program instructions that, when executed by a processor, implement the steps of the method for scheduling an item provided by the present disclosure.

Figure 4:
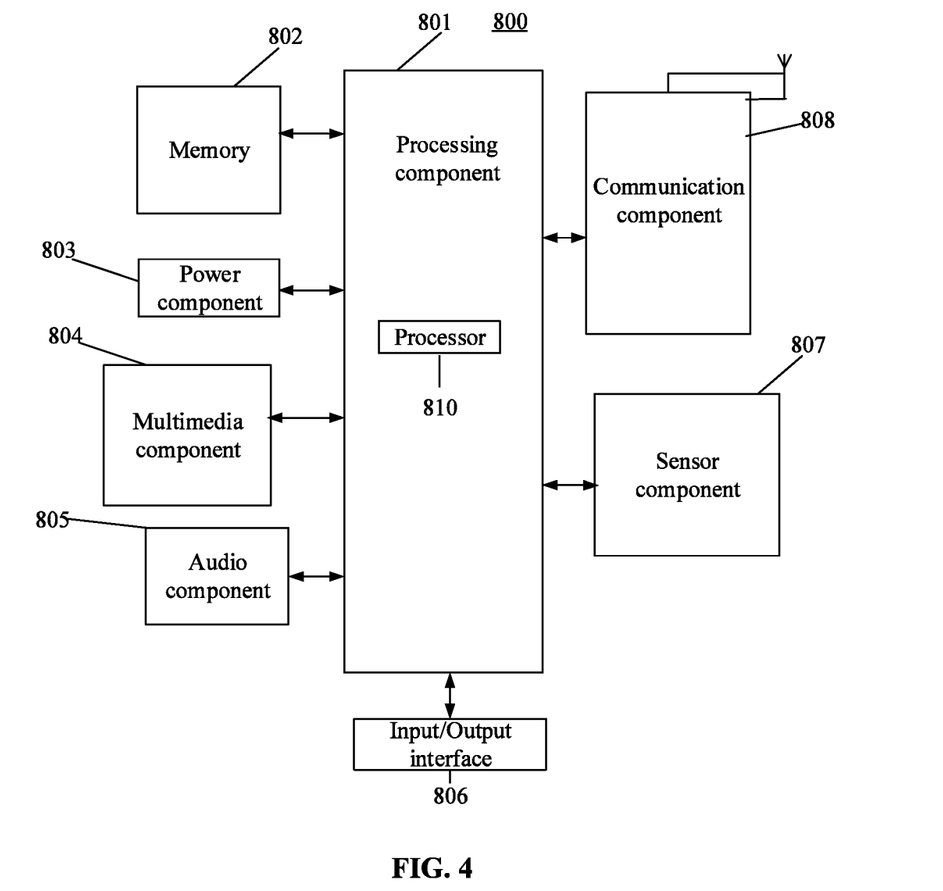
FIG. 4 is a block diagram of an apparatus for scheduling an item according to an exemplary embodiment.

FIG. 4 is a block diagram of an apparatus 800 for scheduling an item according to an exemplary embodiment. For example, the apparatus 800 may be a mobile phone, a computer, a digital broadcast terminal, a messaging device, a gaming console, a tablet, a medical device, exercise equipment, a personal digital assistant, and the like. Still referring to FIG. 4, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described item scheduling methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For example, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate communication, wired or wirelessly, between the apparatus 800 and other devices. The apparatus 800 may access a wireless network based on a communication standard, such as Wi-Fi, 2Q or 3Q or a combination thereof. In one exemplary embodiment, the communication component 816 receives a broadcast signal or broadcast associated information from an external broadcast management system via a broadcast channel. In an exemplary embodiment, the communication component 816 further includes a Near Field Communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described item scheduling methods.

In exemplary embodiments, there is also provided a non-transitory computer readable storage medium including instructions, such as included in the memory 804, executable by the processor 820 in the apparatus 800, for performing the above-described item scheduling methods. For example, the non-transitory computer-readable storage medium may be a ROM, a random access memory (RAM), a CD-ROM, a magnetic tape, a floppy disc, an optical data storage device and the like.

In another exemplary embodiment, there is further provided a computer program product. The computer program product includes a computer program that can be executed by a programmable apparatus, and the computer program has a code part for performing the above method for scheduling an item when executed by the programmable apparatus.

Figure 5:
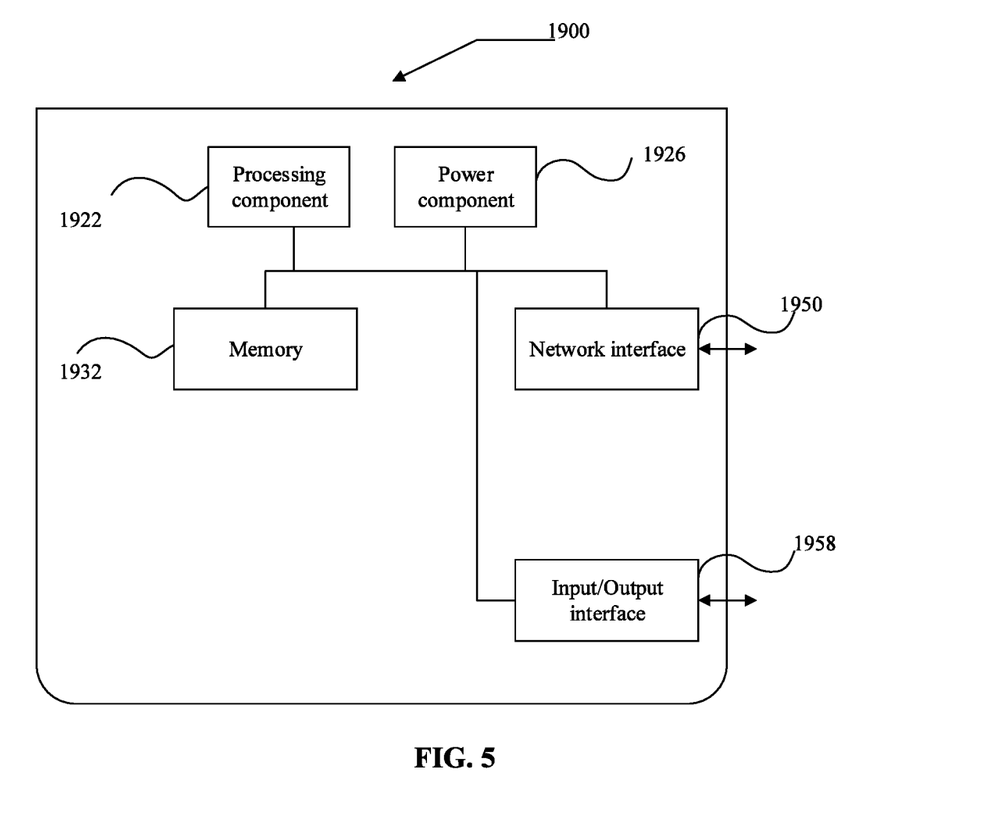
FIG. 5 is a block diagram of an apparatus for scheduling an item according to an exemplary embodiment.

FIG. 5 is a block diagram of an item scheduling apparatus 1900 according to an exemplary embodiment. For example, the apparatus 1900 may be provided as a server. Referring to FIG. 5, the apparatus 1900 includes a processing component 1922, which further includes one or more processors, and a memory resource represented by a memory 1932, for storing instructions executable by the processing component 1922, such as application programs. The application programs stored in the memory 1932 may include one or more modules each corresponding to a set of instructions. In addition, the processing component 1922 is configured to execute instructions to execute the above item scheduling method.

The apparatus 1900 may also include a power component 1926 configured to perform power management of the apparatus 1900, a wired or wireless network interface 1950 configured to connect the apparatus 1900 to a network, and an I/O interface 1958. The apparatus 1900 may be operated based on an operating system stored in the memory 1932, such as Windows Server™, Mac OS X™, Unix™, Linux™, FreeBSD™, or the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for scheduling an item, performed by a server for scheduling the item which comprises a processor, a memory and a Near Field Communication (NFC) communicator configured to facilitate communication, wired or wirelessly, between the server and other devices, comprising:

acquiring, by the server for scheduling the item, a first time sequence corresponding to a target item in a target warehouse, the first time sequence including shipment volume information of the target item corresponding to each unit time within a first historical period;

determining, by the server for scheduling the item, total shipment volume information of the target item within a target period through a shipment prediction model based on the first time sequence and a target period to be predicted, the target period including at least one unit time, the shipment prediction model including a plurality of parallel first time sequence sub-models and a weighted sub-model which is connected to an output of each of the parallel first time sequence sub-models that are configured to determine shipment estimation information of the target item within the target period according to the first time sequence and the target period, and the weighted sub-model being configured to perform a weighted summation on pieces of the shipment estimation information which are output by the parallel first time sequence sub-models to determine the total shipment volume information according to a result of the weighted summation;

determining, by the server for scheduling the item, demand amount information of the target item according to the total shipment volume information and the current inventory information of the target item in the target warehouse;

determining, by the server for scheduling the item, cost characteristic information of each of item providers, which are capable of providing the target item to the target warehouse, about providing the target item; and determining, by the server for scheduling the item, the target item provider and the supply amount information corresponding to the target item provider based on the cost characteristic information of each of the item providers and the demand amount information of the target item, wherein the shipment prediction model is obtained by:

constructing training samples according to shipment volume information of the target item in the target warehouse corresponding to each unit time within a second historical period;

training a preset model according to the training samples, wherein the preset model includes a plurality of parallel second time sequence sub-models and a weighted sub-model which is connected to an output of each of the parallel second time sequence sub-models, and a number of the parallel second time sequence sub-models is not less than a number of the parallel first time sequence sub-models;

acquiring a weight of a connection between each of the parallel second time sequence sub-models and the weighted sub-model in the preset model after the training of the preset model is finished; and determining a second time sequence sub-model with an absolute value of the weight that is greater than a preset threshold as a first time sequence sub-model to obtain the shipment prediction model, wherein the cost characteristic information is of multiple types and each type of cost characteristic information has a respective weight, and the method further comprises:

setting multiple groups of weights corresponding to the cost characteristic information in advance;

determining a test supply amount set corresponding to a preset demand amount information by using each group of weights as test weights;

calculating a matching degree between each test supply amount set and a supply-and-demand requirement;

determining a group of weights corresponding to a maximum matching degree as a target weight group; and updating a weight corresponding to each type of cost characteristic information based on the target weight group.

2. The method of claim 1, wherein each of the parallel first time sequence sub-models comprises a decomposition item set that includes one or more decomposition items, respective decomposition item sets corresponding to the parallel first time sequence sub-models have a same type, and a same decomposition item has different parameter values when the same decomposition item is included in different parallel first time sequence sub-models.

3. The method of claim 1, wherein:
determining the target item provider and the supply amount information corresponding to the target item provider further comprises:
weighting, for each of the item providers, the multiple types of cost characteristic information of the item provider according to the weights corresponding to respective types of cost characteristic information to obtain target item information of the item provider about providing the target item; and
sequentially selecting, in an ascending order of the target cost information, the target item provider from the item providers, and determining the supply amount information corresponding to the target item provider so that a sum of the supply amount information corresponding to all the target item providers reaches the demand amount information of the target item.

4. The method of claim 3, further comprising:
periodically updating the weight corresponding to each type of cost characteristic information.

5. A server for scheduling an item, comprising:
a processor;
a memory configured to store processor-executable instructions; and
a Near Field Communication (NFC) communicator configured to facilitate communication, wired or wirelessly, between the server and other devices,
wherein the processor is configured to:
acquire a first time sequence corresponding to a target item in a target warehouse, the first time sequence including shipment volume information of the target item corresponding to each unit time within a first historical period;
determine total shipment volume information of the target item within a target period through a shipment prediction model based on the first time sequence and a target period to be predicted that includes at least one unit time, the shipment prediction model including a plurality of parallel first time sequence sub-models and a weighted sub-model which is connected to an output of each of the parallel first time sequence sub-models, each of the parallel first time sequence sub-models being configured to determine shipment estimation information of the target item within the target period according to the first time sequence and the target period, and the weighted sub-model being configured to perform a weighted summation on pieces of the shipment estimation information which are output by the parallel first time sequence sub-models so as to determine the total shipment volume information according to a result of the weighted summation;
determine demand amount information of the target item according to the total shipment volume information and the current inventory information of the target item in the target warehouse;
determine cost characteristic information of each of item providers, which are capable of providing the target item to the target warehouse, about providing the target item; and
determine the target item provider and the supply amount information corresponding to the target item provider based on the cost characteristic information of each of the item providers and the demand amount information of the target item
wherein the shipment prediction model is obtained by:
constructing training samples according to shipment volume information of the target item in the target warehouse corresponding to each unit time within a second historical period;
training a preset model according to the training samples, wherein the preset model includes a plurality of parallel second time sequence sub-models and a weighted sub-model which is connected to an output of each of the parallel second time sequence sub-models, and a number of the parallel second time sequence sub-models is not less than the number of the parallel first time sequence sub-models;
acquiring a weight of a connection between each of the parallel second time sequence sub-models and the weighted sub-model in the preset model after the training of the preset model is finished; and
determining a second time sequence sub-model with an absolute value of the weight that is greater than a preset threshold as a first time sequence sub-model to obtain the shipment prediction model,
wherein the cost characteristic information is of multiple types and each type of cost characteristic information has a respective weight, and the processor is further configured to:
set multiple groups of weights corresponding to the cost characteristic information in advance;
determine a test supply amount set corresponding to a preset demand amount information by using each group of weights as test weights;
calculate a matching degree between each test supply amount set and a supply-and-demand requirement;
determine a group of weights corresponding to a maximum matching degree as a target weight group; and
update a weight corresponding to each type of cost characteristic information based on the target weight group.

6. The server of claim 5, wherein each of the parallel first time sequence sub-models comprises a decomposition item set that includes one or more decomposition items, respective decomposition item sets corresponding to the parallel first time sequence sub-models have a same type, and a same decomposition item has different parameter values when the same decomposition item is included in different parallel first time sequence sub-models.

7. The server of claim 5, wherein the processor is further configured to:
weight, for each of the item providers, the multiple types of cost characteristic information of the item provider according to the weights corresponding to respective types of cost characteristic information to obtain target item information of the item provider about providing the target item; and
sequentially select, in an ascending order of the target cost information, the target item provider from the item providers, and determine the supply amount information corresponding to the target item provider so that a sum of the supply amount information corresponding to all the target item providers reaches the demand amount information of the target item.

8. The server of claim 7, wherein the processor is further configured to:

periodically update the weight corresponding to each type of cost characteristic information.

9. A non-transitory computer-readable storage medium having computer program instructions stored thereon that, when executed by a server including a processor, a memory and a Near Field Communication (NFC) communicator configured to facilitate communication, wired or wirelessly, between the server and other devices, cause the processor to implement operations comprising:

acquiring a first time sequence corresponding to a target item in a target warehouse, the first time sequence including shipment volume information of the target item corresponding to each unit time within a first historical period;

determining total shipment volume information of the target item within a target period through a shipment prediction model based on the first time sequence and a target period to be predicted, the target period including at least one unit time, the shipment prediction model including a plurality of parallel first time sequence sub-models and a weighted sub-model which is connected to an output of each of the parallel first time sequence sub-models, each of the parallel first time sequence sub-models being configured to determine shipment estimation information of the target item within the target period according to the first time sequence and the target period, and the weighted sub-model being configured to perform a weighted summation on pieces of the shipment estimation information which are output by the parallel first time sequence sub-models so as to determine the total shipment volume information according to a result of the weighted summation;

determining, by the server for scheduling the item, demand amount information of the target item according to the total shipment volume information and the current inventory information of the target item in the target warehouse;

determining, by the server for scheduling the item, cost characteristic information of each of item providers, which are capable of providing the target item to the target warehouse, about providing the target item; and determining, by the server for scheduling the item, the target item provider and the supply amount information corresponding to the target item provider based on the cost characteristic information of each of the item providers and the demand amount information of the target item, wherein the shipment prediction model is obtained by:

constructing training samples according to shipment volume information of the target item in the target warehouse corresponding to each unit time within a second historical period;

training a preset model according to the training samples, wherein the preset model includes a plurality of parallel second time sequence sub-models and a weighted sub-model which is connected to an output of each of the parallel second time sequence sub-models, and a number of the parallel second time sequence sub-models is not less than the number of the parallel first time sequence sub-models;

acquiring a weight of a connection between each of the parallel second time sequence sub-models and the weighted sub-model in the preset model after the training of the preset model is finished; and determining a second time sequence sub-model with an absolute value of the weight that is greater than a preset threshold as a first time sequence sub-model to obtain the shipment prediction model, wherein the cost characteristic information is of multiple types and each type of cost characteristic information has a respective weight, and the method further comprises:

setting multiple groups of weights corresponding to the cost characteristic information in advance;

determining a test supply amount set corresponding to a preset demand amount information by using each group of weights as test weights;

calculating a matching degree between each test supply amount set and a supply-and-demand requirement;

determining a group of weights corresponding to a maximum matching degree as a target weight group; and updating a weight corresponding to each type of cost characteristic information based on the target weight group.

10. The non-transitory computer-readable storage medium of claim 9, wherein each of the parallel first time sequence sub-models includes a decomposition item set having one or more decomposition items, respective decomposition item sets corresponding to the parallel first time sequence sub-models have a same type, and a same decomposition item has different parameter values when the same decomposition item is included in different parallel first time sequence sub-models.

11. The non-transitory computer-readable storage medium of claim 9, wherein:

determining, based on the cost characteristic information of each of the item providers and the demand amount information of the target item, the target item provider and the supply amount information corresponding to the target item provider further comprises:

weighting, for each of the item providers, the multiple types of cost characteristic information of the item provider according to the weights corresponding to respective types of cost characteristic information, to obtain target item information of the item provider about providing the target item; and sequentially selecting, in an ascending order of the target cost information, the target item provider from the item providers and determining the supply amount information corresponding to the target item provider so that a sum of the supply amount information corresponding to all the target item providers reaches the demand amount information of the target item.

* * * * *